(12) United States Patent
Wang et al.

(10) Patent No.: US 11,782,183 B2
(45) Date of Patent: Oct. 10, 2023

(54) MAGNETOTELLURIC INVERSION METHOD BASED ON FULLY CONVOLUTIONAL NEURAL NETWORK

(71) Applicant: Institute of Geology and Geophysics, Chinese Academy of Sciences, Beijing (CN)

(72) Inventors: Zhongxing Wang, Beijing (CN); Lili Kang, Beijing (CN); Zhiguo An, Beijing (CN); Ruo Wang, Beijing (CN); Xiong Yin, Beijing (CN)

(73) Assignee: Institute of Geology and Geophysics, Chinese Academy of Sciences, Beijing (CN)

( * ) Notice: Subject to any disclaimer, the term of this patent is extended or adjusted under 35 U.S.C. 154(b) by 0 days.

(21) Appl. No.: 17/840,458

(22) Filed: Jun. 14, 2022

(65) Prior Publication Data
US 2022/0350049 A1   Nov. 3, 2022

Related U.S. Application Data

(63) Continuation of application No. PCT/CN2021/097194, filed on May 31, 2021.

(30) Foreign Application Priority Data

Apr. 26, 2021  (CN) .......................... 202110455258.0

(51) Int. Cl.
  *G01V 3/08* (2006.01)
  *G01V 99/00* (2009.01)
  *G06N 3/08* (2023.01)
(52) U.S. Cl.
  CPC ............ *G01V 99/005* (2013.01); *G01V 3/087* (2013.01); *G01V 3/088* (2013.01); *G06N 3/08* (2013.01)

(58) Field of Classification Search
  CPC ........ G01V 99/005; G01V 3/083; G01V 3/38; G01V 3/087; G01V 3/088; G01V 1/32;
(Continued)

(56) References Cited

U.S. PATENT DOCUMENTS

2019/0064389 A1* 2/2019 Denli .................. G01V 99/005

FOREIGN PATENT DOCUMENTS

CN   110968826 A       4/2020
CN   111126591 A  *    5/2020
(Continued)

OTHER PUBLICATIONS

International Search Report of PCT/CN2021/097194.
(Continued)

*Primary Examiner* — Jeffrey P Aiello
(74) *Attorney, Agent, or Firm* — Dragon Sun Law Firm, PC; Nathaniel Perkins

(57) ABSTRACT

Disclosed is a magnetotelluric inversion method based on a fully convolutional neural network. The magnetotelluric inversion method includes: constructing a multi-dimensional geoelectric model; constructing a fully convolutional neural network structure model to obtain initialized fully convolutional neural network model parameters; training and testing the fully convolutional neural network structure model based on the training sets and the test sets to obtain optimized fully convolutional neural network structure model parameters; determining whether training of the fully convolutional neural network structure model is completed according to fitting error changes corresponding to the training sets and the test sets; and finally, inputting measured apparent resistivity into a trained fully convolutional neural network structure model for inversion, and further optimizing the fully convolutional neural network structure model (Continued)

by analyzing precision of an inversion result until an inversion fitting error satisfies a set error requirement.

9 Claims, 5 Drawing Sheets

(58) Field of Classification Search
CPC .......... G01V 1/282; G01V 11/00; G06N 3/08; G06T 11/006; G06T 2207/10088; G06T 2207/20084; G06T 2207/20081
USPC ......... 324/333; 367/25, 73; 702/2, 7, 13–14, 702/19, 189; 703/10; 706/16
See application file for complete search history.

(56) References Cited

FOREIGN PATENT DOCUMENTS

| | | | |
|---|---|---|---|
| CN | 111126591 S | | 5/2020 |
| CN | 111143984 A | | 5/2020 |
| CN | 111239802 A | | 6/2020 |
| CN | 111812732 A | * | 10/2020 |
| CN | 111812732 A | | 10/2020 |
| FR | 3057092 A1 | | 4/2018 |

OTHER PUBLICATIONS

Written Opinion of PCT/CN2021/097194.
Kang, Lili "Two-dimensional inversion of magnetotelluric based on convolutional neural network", Annual Meeting of Chinese Geoscience Union, Oct. 18, 2020.
Liu, Qingyu "Research on electromagnetic inversion method based on machine learning" China Master's Theses Full-text Database, Jan. 15, 2021.

* cited by examiner

MAGNETOTELLURIC INVERSION METHOD BASED ON FULLY CONVOLUTIONAL NEURAL NETWORK

CROSS-REFERENCE TO RELATED APPLICATIONS

This application is a continuation application of International Patent Application No. PCT/CN2021/097194, which claims priority to Chinese Patent Application No. 202110455258.0, filed with the Chinese Patent Office on Apr. 26, 2021 and entitled "MAGNETOTELLURIC INVERSION METHOD BASED ON FULLY CONVOLUTIONAL NEURAL NETWORK". The above-referenced applications are incorporated herein by reference in their entirety.

TECHNICAL FIELD

The present invention relates to the technical field of magnetotelluric sounding, and in particular to a magnetotelluric inversion method based on a fully convolutional neural network.

BACKGROUND

In both LPDDR4 (Low Power Double Data Rate SDRAM 4) and LPDDR4X applications, a high-speed interface standard of LVSTL (Low Voltage Swing Terminated Logic) is used, and different output pull-down driver capabilities and output high levels can be configured by a memory controller. However, because voltages of data output ports of the two are different, LPDDR4 and LPDDR4X cannot be applied to the same chip. This brings trouble to the application and design of the chip.

The magnetotelluric method (MT) is a geophysical exploration method to study an electrical structure of the earth by utilizing a natural alternating electromagnetic field, with the basic principles as follows: the natural alternating electromagnetic field is taken as a field source (with a frequency band ranging from 10-4 Hz to 104 Hz); the skin effect principle of electromagnetic wave propagation is applied, that is, the penetration of the high-frequency electromagnetic field is shallow, while the penetration of the low-frequency electromagnetic field is deep; the frequency of the electromagnetic field is changed for the purpose of sounding with distance between the field source and the receiving point remaining unchanged, that is, the mutually orthogonal electromagnetic field components are collected on the earth surface, so as to obtain the vertical electrical structure information of the subsurface after data processing. This method does not require an artificial source, and is characterized in advantages such as low cost and simple and convenient construction in actual production, great detection depth, no shielding by high resistance layer and high resolution for low resistance body. Therefore, it has been widely adopted in the exploration and development of mineral resources, oil and gas, geothermal resources, etc., and in fields of deep structure detection of the earth, etc.

The magnetotelluric inversion method is a process of solving a distribution model conforming to an actual subsurface electrical structure, which utilizes objective function gradient information based on mathematical operations such as linear iteration according to measured electromagnetic field response such as apparent resistivity, phase and tipper; and the quality of inversion results directly affects the accuracy of geological interpretation, thereby further affecting the exploration and development of detailed investigation of mineral resources, determination of well location, etc.

Presently, the most widely applied inversion methods include linear iterative inversion methods that linearize non-linear problems, such as Occam, rapid relaxation inversion (RRI) and non-linear conjugate gradient inversion (NLCG). However, such inversion methods have some problems, such as strong dependence on the initial model and tendency to fall into the local extremum.

On this basis, a variety of non-linear global optimization algorithms are applied to magnetotelluric inversion, such as simulated annealing method (SA), genetic algorithm method (GA), particle swarm optimization (PSO) and artificial neural network (ANN). Although this kind of non-linear global optimization inversion methods can overcome the problem of the local extremum and acquire the globally optimal solutions, massive operation memory and long operation time are still required. In addition, the convergence speed of the network used in the artificial neural network method is slow, and the prediction accuracy is decreased with the increase of the amount of resistivity data and model parameters, the location information is subject to loss in the process of network transmission, and over-fitting is likely to occur in the process of training.

SUMMARY

The objective of the present invention is to provide a magnetotelluric inversion method based on a fully convolutional neural network, which utilizes non-linear features of a convolutional neural network to solve the problem of a local extremum in conventional linear inversion, effectively reduce loss of operation memory and time, and improve fitting precision, so as to solve the problems in the prior art.

To solve the above problems, according to one aspect of the present invention, the present invention provides a magnetotelluric inversion method based on a fully convolutional neural network, including: constructing a multi-dimensional geoelectric model based on geological information, performing forward calculation to obtain apparent resistivity of corresponding dimensions to form a sample set, and dividing the sample set into a plurality of training sets and a plurality of test sets according to a specific ratio; constructing a fully convolutional neural network structure model to obtain initialized fully convolutional neural network model parameters; training and testing the fully convolutional neural network structure model, so as to obtain optimized fully convolutional neural network structure model parameters by taking the apparent resistivity as input data and resistivity of the geoelectric model as output data based on the training sets and the test sets; analyzing fitting error changes corresponding to the training sets and the test sets, and terminating training to obtain a trained fully convolutional neural network structure model when fitting errors of the training sets are decreased and fitting errors of the test sets are increased; and inputting measured apparent resistivity into the trained fully convolutional neural network structure model for inversion, and analyzing a accuracy of an inversion result.

The above technical solution of the present invention has beneficial technical effects as follows:

the fully convolutional neural network is utilized to enable non-linear mapping from magnetotelluric apparent resistivity to a resistivity model, solve the problem of a local extremum in conventional linear inversion, and effectively reduce loss of operation memory and time.

The fully convolutional neural network has multi-dimensional input data compatibility, may achieve inversion of multi-dimensional magnetotelluric apparent resistivity data, and may effectively retain spatial position information of measured data.

The fully convolutional neural network adopts a processing mode of local weight sharing, with faster convergence speed and higher fitting precision.

REFERENCE NUMERALS

1—convolution layer; 2—pooling layer; 3—upsampling layer; 4—input data; and 5—output data.

DESCRIPTION OF EMBODIMENTS

In the following, only some example embodiments are briefly described. As will be appreciated by those skilled in the art, the described embodiments may be modified in various ways without departing from the spirit or scope of the present invention. Therefore, the accompanying drawings and descriptions are considered to be essentially exemplary and not limiting.

To make the objectives, technical solutions and advantages of the present invention clearer, the present invention will be further described in detail below in conjunction with the specific implementations with reference to the accompanying drawings. It should be understood that these descriptions are merely exemplary and are not intended to limit the scope of the present invention. In addition, the description of a well-known structure and technology is omitted to avoid unnecessary confusion of the concept of the present invention in the following description.

The present invention will be described in detail below with reference to the accompanying drawings and embodiments.

Figure 1:
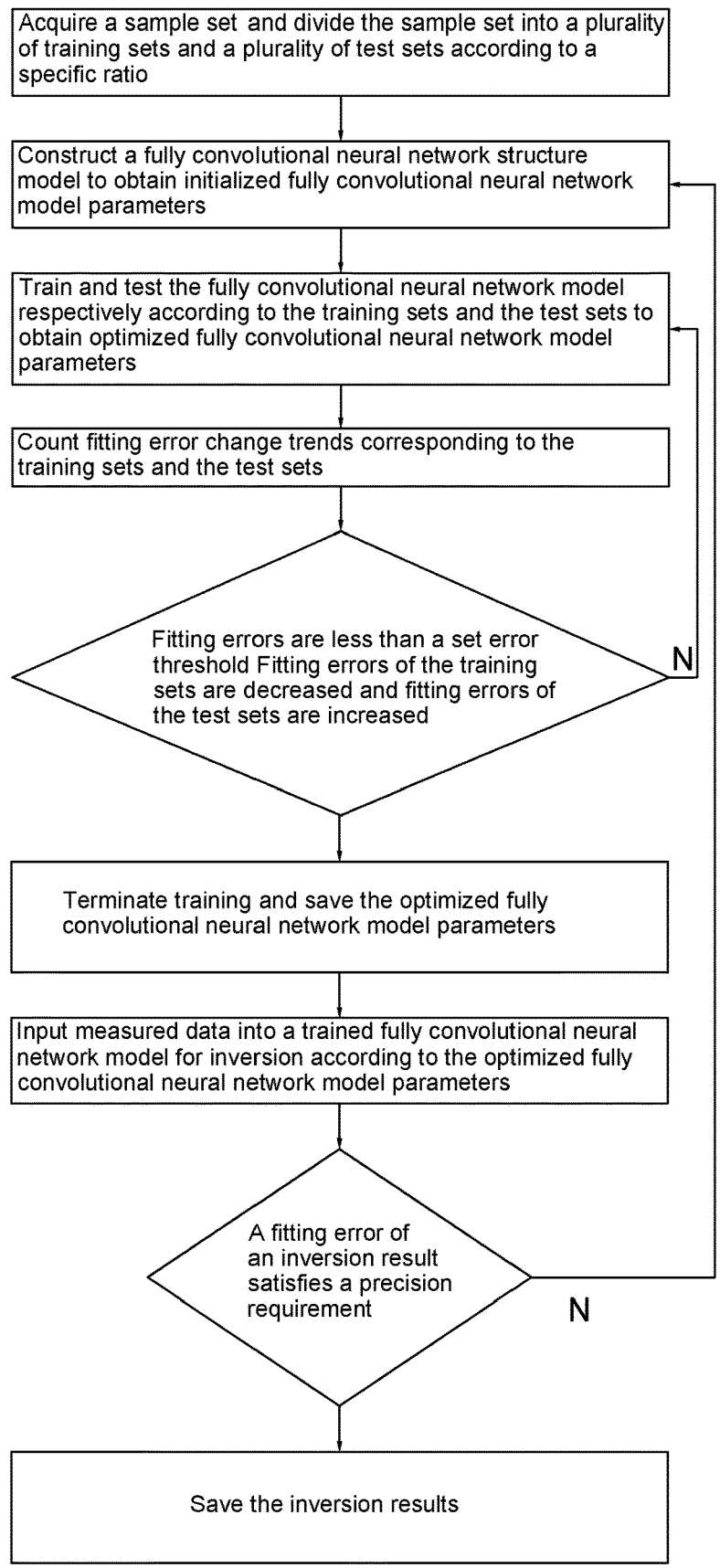
FIG. 1 is a flow diagram of a magnetotelluric inversion method based on a fully convolutional neural network provided in the present invention.

The embodiment of the present invention provides a magnetotelluric inversion method based on a fully convolutional neural network, which may directly establish a feature mapping relation between input data and output data by utilizing the fully convolutional neural network, thereby achieving electromagnetic data inversion, that is, achieving non-linear mapping of a model from magnetotelluric apparent resistivity to resistivity. FIG. 1 is a flow schematic diagram of a magnetotelluric inversion method based on a fully convolutional neural network provided in the present invention. As shown in FIG. 1, the magnetotelluric inversion method based on a fully convolutional neural network includes the following steps:

S1: acquire a sample set: construct a multi-dimensional geoelectric model based on geological information, perform forward calculation to obtain apparent resistivity of corresponding dimensions to form a sample set, and divide the sample set into a plurality of training sets and a plurality of test sets according to a specific ratio, where the number of the training sets is greater than that of the test sets.

Specifically, in a model training process of the fully convolutional neural network, the sample set is divided into the plurality of training sets and the plurality of test sets, such that the degree of model training (i.e. evaluation fitting errors) may be conveniently and continuously determined, the training sets are used for training the geoelectric model to obtain network model parameters, and the test sets are used for determining the degree of geoelectric model training on a regular basis, and therefore, the number of the training sets is greater than that of the test sets.

Preferably, the specific ratio refers to an integer ratio of the number of the training sets to the number of the test sets. Specifically, the number of the test sets is greater than 1 and the number of the training sets is greater than 5 times of the number of test sets, that is, the specific ratio is greater than 5:1. Thus, after the geoelectric model is trained every a certain number of training sets, a test may be performed once, that is, after the geoelectric model is trained with the 5 training sets, the training degree of the geoelectric model is determined with 1 test set. When the test sets determine that a fitting error obtained through training of the geoelectric model satisfies a precision requirement, the training of the geoelectric model is terminated.

Optionally, an early stopping method is used while the sample set is divided into the training sets and the test sets according to the specific ratio, and the early stopping method is used for inhibiting over-fitting existing in geoelectric model training.

The early stopping method means that when fitting errors of the training sets are decreased but fitting errors of the test sets are increased, the training is stopped in advance and returned, and corresponding network model parameters during a minimum error of the test sets are acquired. Over-fitting refers to a phenomenon that when the geoelectric model trained by the training sets is used for fitting other test or measured data not including the training sets, the fitting precision is too low and even the fitting may not be performed completely.

S1 of constructing a multi-dimensional geoelectric model based on geological information, and performing forward calculation to obtain apparent resistivity of corresponding dimensions to form a sample set specifically includes:

S11, identify a region in which a subsurface anomaly of the geoelectric model is located with a regular geometrical shape, and perform forward calculation to obtain the apparent resistivity of the subsurface anomaly.

Optionally, the geometrical shape includes a polygon or a circle.

Optionally, a forward algorithm includes an integral equation method, a bilinear interpolation finite element method, a finite difference method or a finite volume method.

S12, set a value range of the apparent resistivity of the subsurface anomaly in the geoelectric model to form a sample set, where the value of the apparent resistivity of the subsurface anomaly may be arbitrarily assigned within the value range.

For example, if 9,500 sets of geoelectric models are included, 8,000 groups of geoelectric models are selected as training sets, while the remaining 1,500 groups of geoelectric models are selected as test sets.

In this embodiment, the geoelectric model includes a layered geoelectric model, a two-dimensional geoelectric model or a three-dimensional geoelectric model. When the geoelectric model is the layered geoelectric model, apparent resistivity of a subsurface anomaly is only changed in a depth direction, i.e. one-dimensional model; when the geoelectric model is the two-dimensional geoelectric model, apparent resistivity of a subsurface anomaly is changed in the depth direction and a transverse direction simultaneously, or is changed in the depth direction and a longitudinal direction simultaneously, i.e. two-dimensional model; and when the geoelectric model is the three-dimensional geoelectric model, apparent resistivity of a subsurface anomaly is changed in the depth direction, the longitudinal direction and the transverse direction simultaneously, i.e. three-dimensional model.

Moreover, when the geoelectric model is the layered geoelectric model (one-dimensional), the apparent resistivity of the subsurface anomaly is calculated by using a one-dimensional forward modelling method; when the geoelectric model is the two-dimensional geoelectric model (two-dimensional), the apparent resistivity of the subsurface anomaly is calculated by using a two-dimensional forward modeling method; and when the geoelectric model is a three-dimensional geoelectric model (three-dimensional), the apparent resistivity of the subsurface anomaly is calculated by using a three-dimensional forward modeling method.

That is, the geoelectric models with different dimensions correspond to different forward modeling methods, correspond to different sample sets and correspond to subsequent inversions.

S2, construct a fully convolutional neural network structure model, and train and test the fully convolutional neural network structure model to obtain fully convolutional neural network model parameters by taking the apparent resistivity as input data and resistivity of the geoelectric model as output data according to the training sets.

In this embodiment, structural parameters in the fully convolutional neural network structure model include: the number of convolution layers, the number of pooling layers, the number of upsampling layers, sizes of convolution kernels in the convolution layers, sizes of pooling windows of the pooling layers, sizes of upsampling windows of the upsampling layers and a moving step size.

To ensure inversion precision of the high-dimensional complex model, the smaller an iteration error threshold, the greater the number of iterations during high-dimensional inversion. The sizes of the convolution kernels, the pooling windows and the upsampling windows may also be configured according to complexity of the model, that is, the sizes of the convolution kernels, the pooling windows and the upsampling windows of the one-dimensional model may be set to be smaller as much as possible according to an anomaly size.

A layer between the input data and the output data of the fully convolutional neural network structure model is a middle layer (hidden layer), and for a fully convolutional neural network, the middle layer is divided into two parts: a convolution (coding) part and a deconvolution (decoding) part. The convolution part and the deconvolution part of the fully convolutional neural network structure model are symmetrical, that is, the output data of each layer are obtained by means of convolution operation of part of the input data of the previous layer.

Figure 2:
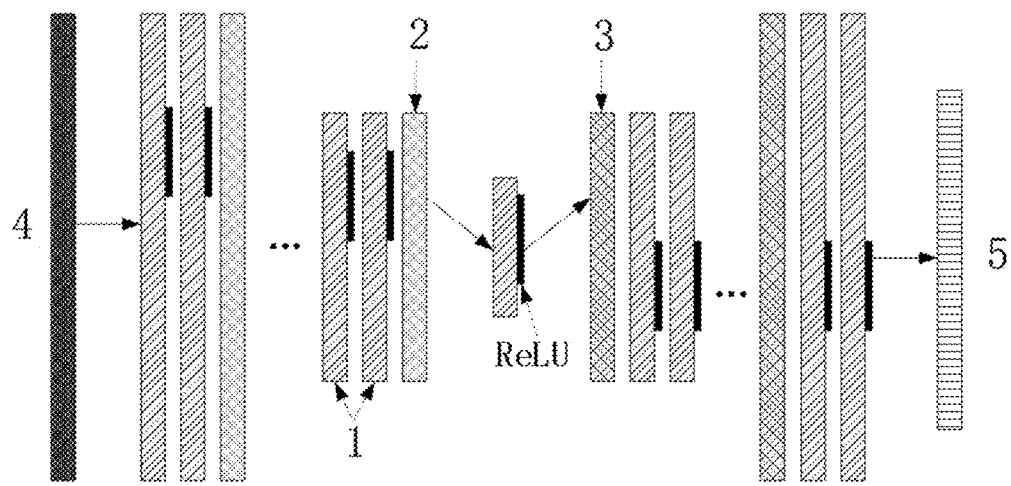
FIG. 2 is a schematic diagram of a fully convolutional neural network structure model provided in an embodiment of the present invention.

FIG. 2 is a schematic diagram of a fully convolutional neural network structure model provided in an embodiment of the present invention. As shown in FIG. 2, the fully convolutional neural network structure model is composed of convolution layers 1, pooling layers 2 and upsampling layers 3, where the number of the convolutional layers, the number of the pooling layers and the number of the upsampling layers are adjustable, provided that the number of the pooling layers 2 is maintained equal to that of the upsampling layers 3. It is ensured that network structures corresponding to the convolution (coding) part and the deconvolution (decoding) part of the fully convolutional neural network are completely symmetric, so as to recover the data dimension.

In the model training process, the one-dimensional model may be achieved only by adding training data to inhibit over-fitting; the two-dimensional model generally uses a regularization method to add weight decay into the loss function to inhibit over-fitting; and the three-dimensional model may use the dropout technology, i.e. a method of randomly deleting neurons, to inhibit over-fitting.

S2 further includes: utilize a loss function to calculate an error between the output data of the fully convolutional neural network structure model and the geoelectric model corresponding to the input data, where the loss function refers to an error evaluation function between the output data of the fully convolutional neural network structure model and target output data in a fully convolutional neural network training process and includes: a mean absolute value error or a mean squared error. When the geoelectric model is the layered geoelectric model (one-dimensional), the mean squared error is used for calculation; and when the geoelectric model is the two-dimensional geoelectric model (two-dimensional) and the three-dimensional geoelectric model (three-dimensional), the mean absolute value error is used for calculation.

Specifically, the mean squared error (MSE) is:

$$\text{Loss}_{MSE}(y^L, y) = \frac{1}{n^L} \sum_{j=1}^{n^L} (y_j^L - y_j)^2,$$

where y denotes a geoelectric model parameter in training sets or test sets in a network training process; $y^L$ denotes output geoelectric model data obtained through calculation after fully convolutional neural network parameters are updated for the $(L-1)^{th}$ time in the network training process; $n^L$ denotes the total number of output geoelectric model data obtained through calculation after the fully convolutional neural network parameters are updated for the $(L-1)^{th}$ time in the network training process; $y_j$ denotes the $j^{th}$ element in the geoelectric model parameters in the training sets or the test sets in the network training process; denotes the $j^{th}$ element of the output geoelectric model data obtained through calculation after the fully convolutional neural network parameters are updated for the $(L-1)^{th}$ time in the network training process; and j denotes an element identifier of the geoelectric model data.

The mean absolute value error (MAE) is:

$$\text{Loss}_{MSE}(y^L, y) = \frac{1}{n^L} \sum_{j=1}^{n^L} |y_j^L - y_j|,$$

where y denotes a geoelectric model parameter in training sets or test sets in a network training process; $y^L$ denotes output geoelectric model data obtained through calculation after fully convolutional neural network parameters are updated for the $(L-1)^{th}$ time in the network training process; $n^L$ denotes the total number of output geoelectric model data obtained through calculation after the fully convolutional neural network parameters are updated for the $(L-1)^{th}$ time in the network training process; $y_j$ denotes the $j^{th}$ element in the geoelectric model parameters in the training sets or the test sets in the network training process; denotes the $j^{th}$ element of the output geoelectric model data obtained through calculation after the fully convolutional neural network parameters are updated for the $(L-1)^{th}$ time in the network training process; and j denotes an element identifier of the geoelectric model data.

S3, test the fully convolutional neural network structure model by taking the apparent resistivity obtained through forward calculation as input data and the geoelectric model resistivity as output data according to the test sets.

S3 further includes: calculate an error between the output data of the fully convolutional neural network structure model and the geoelectric model corresponding to the input data by utilizing the loss function.

S4, repeat S2 and S3, count fitting error change trends corresponding to the training sets and the test sets, terminate training when fitting errors of the training sets are decreased and fitting errors of the test sets are increased, and save fully convolutional neural network model parameters.

S5, perform inversion on measured data according to the stored fully convolutional neural network model parameters to obtain the resistivity data.

S6, determine whether an inversion result of the measured data satisfies a precision requirement, and if not, repeat S2-S5 until the inversion result satisfies the requirement.

Specifically, S6 of determining whether the precision satisfies the requirement includes:

S71, the inversion result satisfies the precision requirement when the fitting error is less than a set error threshold and a relative error between simulation data obtained through forward calculation of the inversion result and the measured data is less than the set error threshold; otherwise, reconstruct the fully convolutional neural network structure model; and S72, qualitatively compare an electrical anomaly region and resistivity of the electrical anomaly region in the inversion result with electrical information of geological features, and analyze consistency of the inversion result and the electrical information of the geological features to ensure that the electrical anomaly region and the resistivity in the inversion result match known geological data.

Embodiment 1: Two-Dimensional Anomaly Inversion Simulation Model

High-resistance and low-resistance anomaly models are established, subdivision is performed by using rectangular grids, and a bilinear interpolation finite element method is utilized for forward calculation to obtain input data of a simulation test model.

Figure 3:
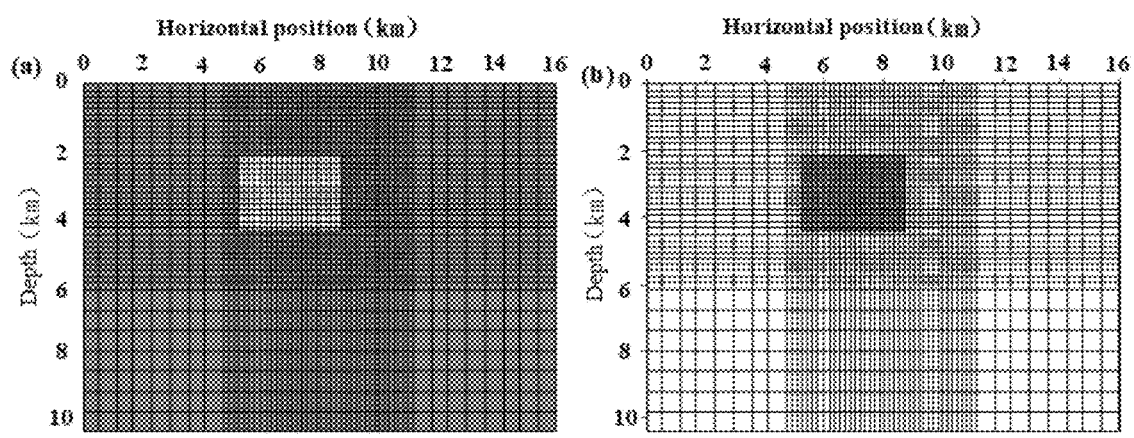
FIG. 3 is a schematic diagram of a test model sample and grid subdivision provided in embodiment 1 of the present invention.

FIG. 3 is a schematic diagram of a test model sample and grid subdivision provided in embodiment 1 of the present invention. As shown in FIG. 3, (a) denotes a low-resistance anomaly and (b) denotes a high-resistance anomaly in FIG. 3; further in FIG. 3, dark regions (peripheral region of (a) in FIG. 3, and middle rectangular region of (b) in FIG. 3) denote high resistance having resistivity values ranging from 1,000 Ω·m to 1,500 Ω·m, and light regions (middle rectangular region of (a) in FIG. 3, and peripheral region of (b) in FIG. 3) denote low resistance having resistivity values ranging from 100 Ω·m to 600 Ω·m. Rectangular regions in the middle of (a) and (b) in FIG. 3 denote anomalies, and other regions denote uniform surrounding rocks. Transverse and longitudinal dimensions of the anomalies vary between 1.2 km and 4 km.

The value of resistivity of the anomalies and the surrounding rocks is arbitrarily assigned within value ranges of the anomalies and the surrounding rocks, that is, random numbers within the corresponding value ranges are used as the resistivity of the rectangular anomaly regions and the surrounding rocks. Thus, 9,500 sets of abnormal geoelectric models with high resistance and low resistance of random rectangles are generated respectively, 8,000 sets of abnormal geoelectric models are selected as training sets, and the remaining 1,500 sets of abnormal geoelectric models are selected as test sets.

In the simulation test model, sizes of grids in regions in which the anomalies are located are designed to be 200 m, sizes of grids of an extension region are designed to be 600 m, and 8 extension units are designed on each of two sides and a lower part. Air layers are required to be considered, and thus, 8 air layer units extend upwards during grid subdivision, and it is ensured that the air layers extend to 10 kilometers. A total of 32 measuring points at equal interval are selected on the ground, a distance between the measuring points is 200 m, and 36 frequency points at equal logarithm intervals are selected within a frequency range of 10-3 Hz to 102 Hz.

Figure 4:
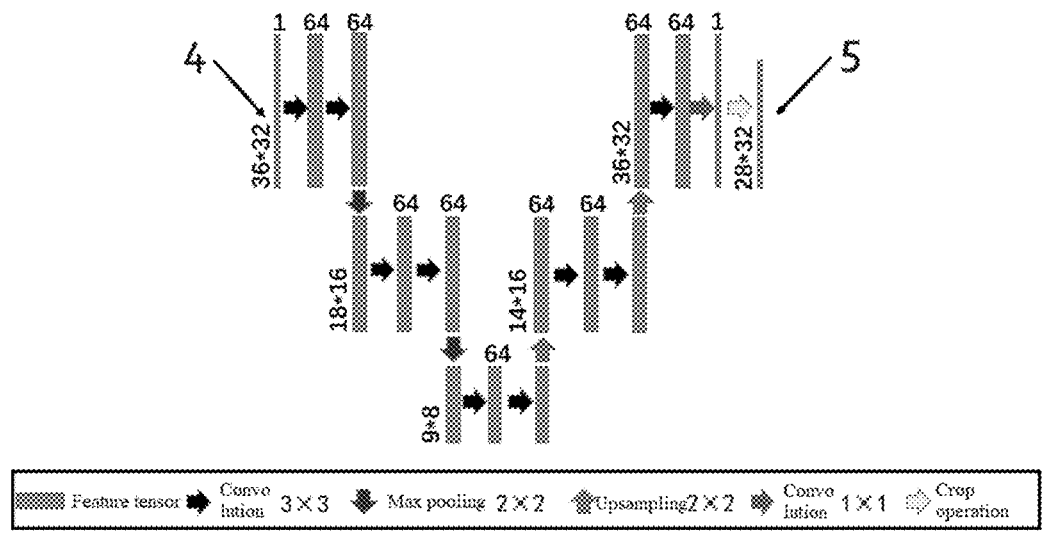
FIG. 4 is a structural schematic diagram of a fully convolutional neural network model in simulation model inversion provided in embodiment 1 of the present invention.

FIG. 4 is a structural schematic diagram of a fully convolutional neural network structure model in simulation model inversion provided in embodiment 1 of the present invention. As shown in FIG. 4, in the fully convolutional neural network structure, 1 pooling layer is designed every 2 convolution layers in a convolution (coding) part to downsample a feature tensor. Convolution kernels are arranged with dimensions of 3×3 and step sizes of 2. The pooling layers have pooling windows of 2×2, step sizes of 2, and a pooling mode of max pooling. An output feature vector of the coding part enters a decoding process after passing through one convolution layer having the convolution kernel of 3×3 and the step size of 2. The convolution layers and upsampling layers are symmetrically designed in a decoding part, that is, two-layer convolution is performed on a feature vector every 1 upsampling layer. The convolution kernel is still 3×3 with a step size of 2, and an upsampling window is 2×2, and has a step size of 2. After two times of upsampling, dimension of the feature tensor is restored to dimensionality before pooling. Then, through crop operation, the dimension is consistent with dimension of output data.

Input data 4 is a 36×32×1 apparent resistivity matrix, and is changed into a 36×32×64 feature tensor after one layer of convolution. After passing through a convolution layer having the same convolution kernel and step size, the dimension of a feature vector matrix is not changed. After down-sampling of 2 layers of max pooling layers having windows of 2×2 and step sizes of 2, the dimension of the feature vector is changed into 9×8×64. Symmetrically, in a deconvolution part, after two times of upsampling of the window of 2×2 and the step size of 2, the dimension of the feature vector matrix is restored to 36×32×64. Then, the feature vector passes through a convolution layer of one layer of 1×1 convolution kernel to obtain a quasi-output layer of which a matrix dimension is 36×32×1. The extension region is not considered in output data 5, only inversion resistivity in corresponding depths is output, and 28 depths are set for output. Therefore, after the quasi-output matrix is crop, output data having a dimension of 28×32×1 may be obtained. In the structure, a rectified linear unit (ReLU) activation function is used after each convolution layer to enhance non-linear mapping capability.

Figure 5:
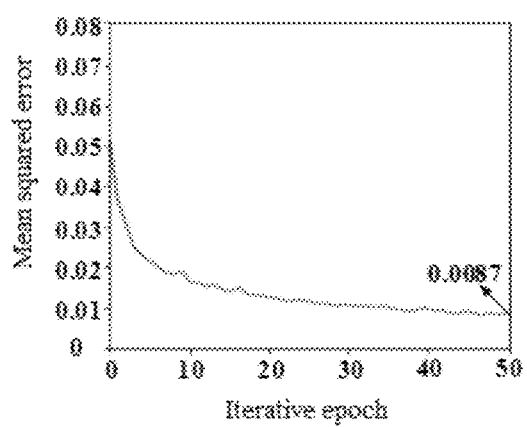
FIG. 5 is a schematic diagram of a network model test error in simulation model inversion provided in embodiment 1 of the present invention.

A mean squared error (MSE) is selected as a loss function, an optimizer is arranged to Adam, an iterative epoch is set to 50, and an initial learning rate is set to 0.0001. The above network model is trained, when training is stopped, a test error is shown in FIG. 5, which is a schematic diagram of a test error of a network model in simulation model inversion provided in embodiment 1 of the present invention.

Figure 6:
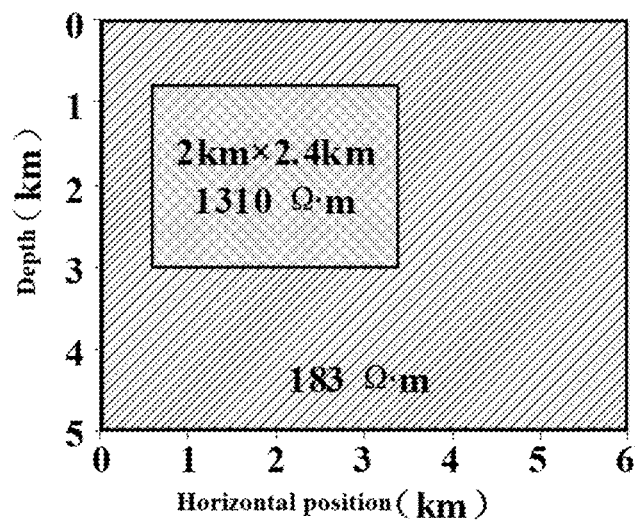
FIG. 6 is a schematic diagram of a high-resistance anomaly inversion test model provided in embodiment 1 of the present invention.

FIG. 6 is a schematic diagram of a high-resistance anomaly inversion test model provided in embodiment 1 of the present invention, and the trained network model is applied to inversion of the high-resistance anomaly model shown in FIG. 6 to test an inversion effect of the network on a simulation model different from a sample set. FIG. 6 shows a high-resistance anomaly having a transverse dimension of 2.4 km and a longitudinal dimension of 2 km, a background resistivity value of 183 Ω·m and a high-resistance anomaly resistivity value of 1,310 Ω·m.

Fully convolutional neural network inversion may basically accurately reflect a position, boundary, size and resistivity change range of the high-resistance anomaly.

Embodiment 2: Measured Data Inversion

This embodiment selects a certain measuring line in a magnetotelluric field detection application test to be subjected to an inversion test, a length of the measuring line is 12 km, a distance between measuring points is 500 m, part of measuring points having large interference are removed, and the total number of the measuring points is 20. Magnetotelluric (MT) measurement in a working region uses a self-research apparatus iEM-I electromagnetic method detection system, a receiver is of a DRU-1C type, and a magnetic sensor is of an IMC-03 type. The system has a working frequency ranging from 0.0001 kHz to 10 kHz, acquisition time is designed according to the required lowest frequency, and acquisition time of each measuring point in the working region is longer than 8 hours. Observation data of 320 Hz to 0.088 Hz frequency bands are intercepted, frequencies are distributed at an equal logarithm interval, and the total number of frequency points is 48.

Figure 7:
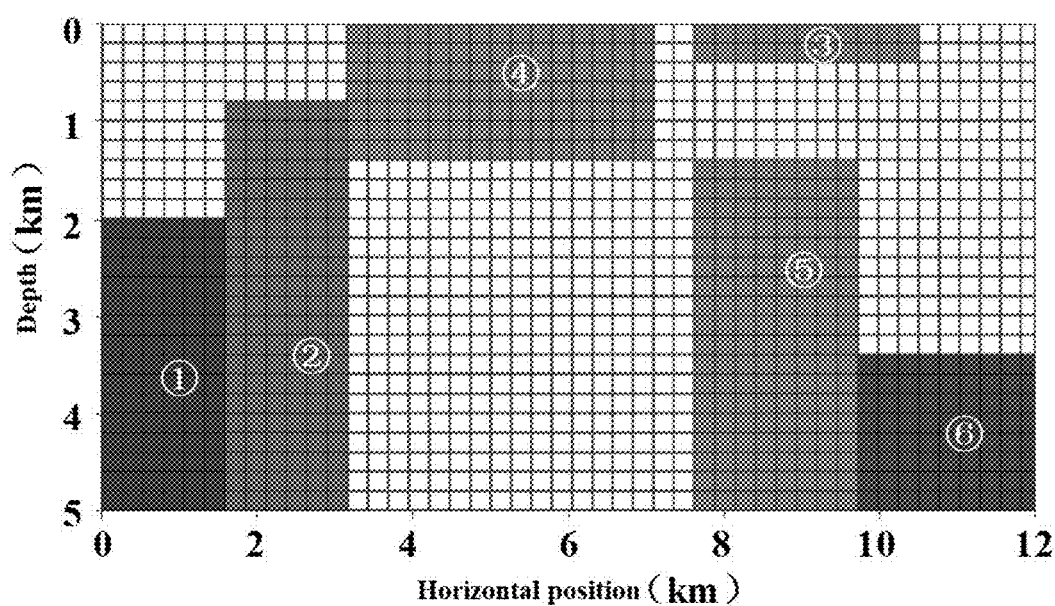
FIG. 7 is a schematic diagram of a measured inversion model training sample provided in embodiment 2 of the present invention.

FIG. 7 is a schematic diagram of a measured inversion model training sample provided in embodiment 2 of the present invention. As shown in FIG. 7, according to known geological data, a sample set as shown in FIG. 7 is constructed, and rectangles are utilized to approximately denote a position and shape of an anomaly in measured data inversion. A rectangular region is utilized to identify high-resistance and low-resistance anomalies within a shallow-to-deep range. Background resistivity is set to be between 100 Ω·m and 300 Ω·m.

In FIG. 7, a resistivity range of high-resistance bodies marked as (1) and (2) are set to be a random number of 5,000 Ω·m to 10,000 Ω·m, a resistivity range of a high-resistance body marked as (3) is set to be a random number of 1,000 Ω·m to 3,000 Ω·m, a resistivity range of low-resistance bodies marked as (4) and (5) is set to be a random number of 5 Ω·m to 10 Ω·m, a resistivity range of a low-resistance body marked as (6) is set to be a random number of 0.1 Ω·m to 5 Ω·m, and accordingly, 1,000 sample sets are established. A total of 850 training sets are arranged, and 150 test sets are arranged.

Figure 8:
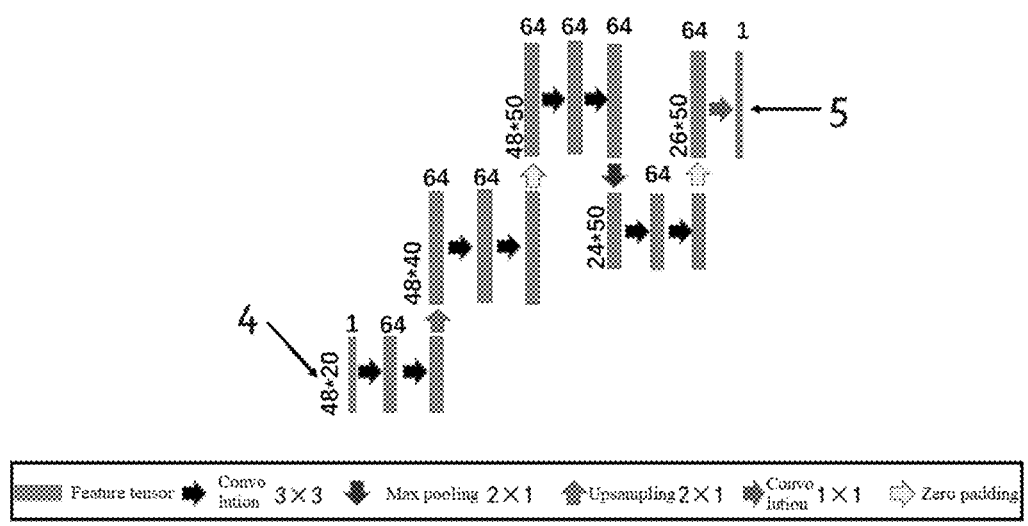
FIG. 8 is a structural schematic diagram of a fully convolutional neural network model in measured data inversion provided in embodiment 2 of the present invention.

FIG. 8 is a structural schematic diagram of a convolutional neural network model in measured data inversion provided in embodiment 2 of the present invention. As shown in FIG. 8, a convolutional neural network (CNN) inversion network is designed, input data is 48×20 two-dimensional apparent resistivity, and output data is output resistivity data of different depths corresponding to the same measuring point. An output resistivity model has a parameter depth ranging from 0 km to 5 km, grids in a longitudinal direction, i.e. a depth direction, are distributed at equal intervals of 200 m, that is, output data is designed to be resistivity of each measuring point at 26 grid depths within the range of 0 km to 5 km, and a dimension of an output matrix is 26×50.

According to the dimension of measured input and output data, a network structure needs to be redefined, and the dimension of a feature tensor is adjusted through 2 times of zero padding, so as to make the dimension of a finally output data matrix consistent with target output. In the structure, a ReLU activation function is used after each convolution layer to enhance non-linear mapping capability. In a model training process, the MSE is selected as a loss function, an optimizer is set to be Adam, an iterative epoch is set to be 15, an initial learning rate is 0.0001, and the above inversion network is trained to obtain convolutional neural network structure model parameters.

Measured data are used as input to perform inversion on measured data, and an inversion result is compared with a conventional inversion method. The CNN inversion result shows that a change range of subsurface resistivity is basically consistent with that of a conventional inversion result. Moreover, the CNN inversion result may basically display a deep granite high-resistance body within a range of 0 km to 3 km and a low-resistance body within the range of 4 km to 8 km. Positions of low-resistance bodies within the range of 10 km to 12 km are well corresponding, and two local high-resistance bodies at a shallow part of an earth surface also have certain performance According to a resistivity change trend within the range of 2 km of a shallow part, a position and trend of a fracture zone similar to a conventional inversion result may be basically determined.

The present invention aims to protect the magnetotelluric inversion method based on a fully convolutional neural network, including: construct a multi-dimensional geoelectric model based on geological information, perform forward calculation to obtain apparent resistivity of corresponding dimensions to form a sample set, and divide the sample set into a plurality of training sets and a plurality of test sets according to a specific ratio; construct a fully convolutional neural network structure model, and train the fully convolutional neural network model to obtain fully convolutional neural network model parameters by taking the apparent resistivity as input data and resistivity of the geoelectric model as output data according to the training sets; count fitting error change trends corresponding to the training sets and the test sets, terminate training when fitting errors of the training sets are decreased and fitting errors of the test sets are increased, and save fully convolutional neural network model parameters; and perform inversion on measured data according to the stored fully convolutional neural network model parameters to obtain resistivity.

It should be understood that the above specific implementations described in the present invention are merely illustrative of the present invention or explanatory of the principle of the present invention, and is not intended to limit the present invention. Therefore, any modifications, equivalent replacements, improvements, etc. made without departing from the spirit and scope of the present invention should all be fall within the scope of protection of the present invention. In addition, the appended claims of the present invention are intended to cover all changes and modifications that fall within the scope and boundary of the appended claims, or equivalent forms of such scope and boundary.

What is claimed is:

1. A magnetotelluric inversion method based on a fully convolutional neural network, comprising:

constructing a multi-dimensional geoelectric model on the basis of geological information, carrying out forward calculation to obtain apparent resistivity of corresponding dimensions to form a sample set, and dividing the sample set into a plurality of training sets and a plurality of test sets according to a specific ratio;

constructing a fully convolutional neural network structure model to obtain initialized fully convolutional neural network model parameters, the multi-dimensional geoelectric model comprising a layered geoelectric model, a two-dimensional geoelectric model or a three-dimensional geoelectric model, the fully convolutional neural network model parameters comprising: the number of convolution layers, the number of pooling layers, the number of upsampling layers, sizes of convolution kernels in the convolution layers, sizes of pooling windows of the pooling layers, sizes of upsampling windows of the upsampling layers and a moving step length, the sizes of the convolution kernels in the convolution layers, the sizes of the pooling windows of the pooling layers and the sizes of the upsampling windows of the upsampling layers being increased when the multi-dimensional geoelectric model is the layered geoelectric model, and the sizes of the convolution kernels in the convolution layers, the sizes of the pooling windows of the pooling layers and the sizes of the upsampling windows of the upsampling layers being reduced when the multi-dimensional geoelectric model is the two-dimensional geoelectric model and the three-dimensional geoelectric model;

training and testing the fully convolutional neural network structure model to obtain optimized fully convolutional neural network structure model parameters by taking the apparent resistivity as input data and resistivity of the geoelectric model as output data on the basis of the training sets and the test sets;

analyzing fitting error changes corresponding to the training sets and the test sets, and ending training to obtain a trained fully convolutional neural network structure model when fitting errors of the training sets are reduced and fitting errors of the test sets are increased; and inputting actually measured apparent resistivity into the trained fully convolutional neural network structure model for inversion, and analyzing precision of an inversion result, the training and testing the fully convolutional neural network structure model comprising:

utilizing a loss function to calculate an error between the output data of the fully convolutional neural network structure model and the multi-dimensional geoelectric model corresponding to the input data, and optimizing the fully convolutional neural network structure model parameters by means of an error back propagation algorithm, training data being added to inhibit an over-fitting phenomenon when the layered geoelectric model is trained, a regularization method being used to add weight decay into the loss function, so as to inhibit an over-fitting phenomenon when the two-dimensional geoelectric model is trained, and neurons being randomly deleted to inhibit an over-fitting phenomenon when the three-dimensional geoelectric model is trained.

2. The method according to claim 1, wherein the constructing a multi-dimensional geoelectric model on the basis of geological information, and carrying out forward calculation to obtain apparent resistivity of corresponding dimensions to form a sample set comprise:

using a regular geometrical shape to identify a region in which a subsurface anomaly of the geoelectric model is located, and carrying out forward calculation to obtain apparent resistivity of the subsurface anomaly; and setting a value range of the apparent resistivity of the subsurface anomaly in the geoelectric model to form a sample set, wherein the apparent resistivity of the subsurface anomaly can be arbitrarily valued within the value range.

3. The method according to claim 1, wherein apparent resistivity of a subsurface anomaly of the layered geoelectric model is changed in a depth direction;

apparent resistivity of a subsurface anomaly of the two-dimensional geoelectric model is changed in the depth direction and a transverse direction at the same time, or is changed in the depth direction and a longitudinal direction at the same time; and apparent resistivity of a subsurface anomaly of the three-dimensional geoelectric model is changed in the depth direction, the longitudinal direction and the transverse direction at the same time.

4. The method according to claim 1, wherein the loss function comprises: a mean absolute value error or a mean squared error;

the error back propagation algorithm selects an adaptive gradient descent algorithm when the multi-dimensional geoelectric model is the layered geoelectric model; and the error back propagation algorithm selects an adaptive moment estimation method when the multi-dimensional geoelectric model is the two-dimensional geoelectric model and the three-dimensional geoelectric model.

5. The method according to claim 1, wherein the number of the training sets is greater than that of the test sets.

6. The method according to claim 1, wherein the specific ratio comprises an integer ratio of the number of the training sets to the number of the test sets; and the specific ratio is greater than 5:1.

7. The method according to claim 1, wherein the analyzing precision of an inversion result comprises:
   analyzing a fitting error of the inversion result, wherein the inversion result meets a precision requirement when the fitting error is less than a set error threshold and a relative error between simulation data obtained through forward calculation of the inversion result and actually measured data is less than the set error threshold; and
   otherwise, reconstructing the fully convolutional neural network structure model.

8. The method according to claim 7, wherein after the analyzing precision of an inversion result, the method further comprises: qualitatively comparing an electrical anomaly region and resistivity of the electrical anomaly region in the inversion result with electrical information of geological features, and analyzing consistency of the inversion result and the electrical information of the geological features.

9. The method according to claim 3, wherein
   an iteration error threshold is reduced and the number of iterations is increased when the multi-dimensional geoelectric model is the two-dimensional geoelectric model and the three-dimensional geoelectric model.

* * * * *